US010699489B2

(12) United States Patent
Pilot et al.

(10) Patent No.: US 10,699,489 B2
(45) Date of Patent: Jun. 30, 2020

(54) METHOD AND SYSTEM FOR DISPLAYING A VIRTUAL ITEM IN AN AUGMENTED REALITY ENVIRONMENT

(71) Applicant: International Business Machines Corporation, Armonk, NY (US)

(72) Inventors: Richard Pilot, Bishopstoke (GB); Philip Jones, Hook (GB); Matthew Bailey, Basingstoke (GB); Andrew J. Daniel, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 16/149,897

(22) Filed: Oct. 2, 2018

(65) Prior Publication Data
US 2020/0105060 A1 Apr. 2, 2020

(51) Int. Cl.
*G06T 19/00* (2011.01)
*G06F 3/01* (2006.01)
*G06F 3/0481* (2013.01)
*G06T 19/20* (2011.01)

(52) U.S. Cl.
CPC ............ *G06T 19/006* (2013.01); *G06F 3/011* (2013.01); *G06F 3/04815* (2013.01); *G06T 19/20* (2013.01)

(58) Field of Classification Search
CPC .............................. G06T 19/006; G06F 3/011
See application file for complete search history.

(56) References Cited

U.S. PATENT DOCUMENTS

| 9,310,883 | B2 | 4/2016 | Weising et al. |
| 9,898,864 | B2 | 2/2018 | Shapira et al. |
| 2013/0222427 | A1* | 8/2013 | Heo ........................ G06F 3/011 345/633 |
| 2013/0290876 | A1 | 10/2013 | Anderson et al. |
| 2014/0002444 | A1* | 1/2014 | Bennett ................... G06F 3/012 345/419 |
| 2015/0193979 | A1 | 7/2015 | Grek |
| 2017/0228139 | A1* | 8/2017 | Goslin ................ G06F 3/04845 |
| 2019/0107935 | A1* | 4/2019 | Spivack .................. G06F 3/011 |
| 2019/0347369 | A1* | 11/2019 | Ebstyne ................ H04W 4/025 |

FOREIGN PATENT DOCUMENTS

WO 2017030985 A1 2/2017

OTHER PUBLICATIONS

He et al., "PhyShare: Sharing Physical Interaction in Virtual Reality", Aug. 10, 2017, 7 pages.
(Continued)

*Primary Examiner* — Jeffery A Brier
(74) *Attorney, Agent, or Firm* — Jorge R. Maranto

(57) ABSTRACT

A method for displaying a virtual item, generated by a user, in a physical space shared with other users, in an augmented reality environment, comprising of forming segments in the physical space, designating a designated interaction type of the segment for placing the virtual item, placing the virtual item, generated by the user, into the segment based on a comparison between the interaction type of the virtual item and the designated interaction type of the segment, and updating a user-accessible repository comprising information on the interaction type of a virtual item and the segment the virtual item is placed in.

20 Claims, 3 Drawing Sheets

(56) References Cited

OTHER PUBLICATIONS

Muller et al., "Studying Collaborative Object Positioning in Distributed Augmented Realities", MUM 2017, Nov. 26-29, 2017, 10 pages.
Kaneto et al., "Space-sharing AR Interaction on Multiple Mobile Devices with a Depth Camera", 2016 IEEE Virtual Reality (VR), Mar. 19-23, 2016, 2 pages.
"Microsoft HoloLens," printed Oct. 2, 2018, 4 pages. https://www.microsoft.com/en-US/hololens

* cited by examiner

METHOD AND SYSTEM FOR DISPLAYING A VIRTUAL ITEM IN AN AUGMENTED REALITY ENVIRONMENT

BACKGROUND

The present disclosure relates to a method, system, and computer program product for displaying a virtual item in an augmented reality environment.

Augmented reality devices are provided to facilitate an augmented visual experience, whereby such a device corresponding to a given user is configured to generate a virtual item and to display it in the physical environment of that user. For example, an augmented reality device can be a headset worn by a user that comprises a software application which, when run on an in-built data processor of the headset, facilitates a virtual item comprising a hologram generated and displayed in a part of the physical environment of that user. The hologram may be used to illustrate a diverse range of scenarios. For example, it may show any one of: a graph depicting a set of results, a to-do list, a computer screen, a three-dimensional model of electromagnetic fields emerging from an engine, and so forth. The visual experience provided by augmented reality devices may be vastly different and viewed as a novelty compared to conventional methods (e.g., viewing graphical results on a flipchart, looking at an entry of a to-do list in a diary, etc.). However, the diversity of scenarios that can be depicted in a given hologram, also makes the use of augmented reality devices very attractive, especially in specific sectors. In this regard, application and/or use of augmented reality devices, in the business sector, can be implemented in various situations. For example, collaborating between different users, providing a more enriched visual experience, and/or offering a better view of the business data stemming from a given user.

In the context of augmented reality, a displayed virtual item may be characterized in respect to user interactions with that virtual item. If a user only views a virtual item, the virtual item is characterized as a type of static interaction (e.g., a hologram displaying graphical data). If a user manipulates a virtual item, or parts thereof, the virtual item is characterized as a direct interaction type (e.g., a hologram of a model that may be manipulated by a user with a three-dimensional modeling tool).

In a typical augmented reality environment shared by multiple users, each user generates and displays a virtual item in the physical space shared with the other users. A given user can, at the very least, view virtual items displayed by the other users, provided a corresponding augmented/mixed reality device comprises software configured to generate the virtual items originating from the other users. In the aforementioned example, the virtual items can comprise of different interaction types. As such, it is possible that respective user interactions with a given virtual item may conflict with other virtual items if the virtual items are placed in the same position. Virtual items may also conflict if the virtual items are in relatively close proximity to each other such that their interaction patterns intersect. For example, a user interacting with a passive/static type virtual item may experience interference if another user is directly interacting with a second virtual item that is in relative proximity to the static virtual item. In another example, a user interacting with a passive/static virtual item interacts with another static virtual item, that has inadvertently been placed in the same position as the first virtual item. The virtual items occupying the same position may cause a type of interference.

Accordingly, problems may arise when users interact with virtual items that are shared by multiple users in an augmented reality domain.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the present disclosure are directed toward a method of displaying a virtual item, generated by a user, in a physical space shared with other users, in an augmented reality environment. The method comprises the steps of forming segments in the physical space. A step of designating a designated interaction type of the segment for placing the virtual item. A step of comparing the designated interaction of the segment with an interaction type of the virtual item. A step of placing, based on the comparing, the virtual item into the segment, and a step of updating a user-accessible repository, wherein the repository comprises of information based on the interaction type of a virtual item and the segment the virtual item is placed in. Virtual items are displayed in an organized and structured manner because dedicated segments comprise the physical space used to place the virtual items. Also, user interactions with virtual items are enhanced due to a reduced occurrence of an interaction conflict because a given segment can be dedicated to a specific interaction type of a virtual item. As a result, virtual items of conflicting interaction types are incapable of being placed in a given segment.

In one embodiment, the method further comprises the steps of consulting the repository and comparing the interaction type of the virtual item to be placed with the designated interaction type of the segment. This embodiment allows for virtual items to be placed into dedicated segments on the basis of their interaction type status.

In another embodiment, the method further comprises the steps of determining whether the interaction type of the virtual item is the same as the designated interaction type of the segment. Upon determining that the interaction type of the virtual item is the same as the designated interaction type of the segment, the step of placing the virtual in the segment. Upon determining that the interaction type of the virtual item is not the same as the designated interaction type of the segment, the step of searching the repository; and the step of placing, based on the searching, the virtual item into another segment.

The above embodiment can reduce the occurrence of a given interaction conflicting because virtual items having the same interaction type status are placed in a designated segment of that interaction type. In this way, a virtual item posing an interaction conflict with a given segment may be placed, with increased probability, into an appropriate segment according to its interaction type status.

In another embodiment, the method further comprises the steps of altering a configuration of the segment to designate a given interaction type and wherein the segment comprises a conflict region for placing virtual items of the same interaction type as the designated interaction type of the segment, and a sub-region assigned for placing virtual items of an interaction type that are different from the designated interaction type of the segment, and the step of updating the repository with information of the altered configuration of the segment. In this way, virtual items differing in interaction type status may still be placed within a given segment, while still conserving a reduced probability of interaction conflicts occurring between them.

In another embodiment, the method uses three-dimensional boundary conditions of the virtual item for placing the virtual item into the segment. This feature can reduce interaction conflicts between virtual items that have the same interaction type status.

Embodiments of the present disclosure are also directed toward a system for displaying a virtual item, generated by a user, in a physical space shared with other users, in an augmented reality environment. The system comprises a segment manager that is operably coupled to the user. The segment manager is configured to form a segment in the physical space, to designate a designated interaction type for the segment for placing the virtual item, and to place the virtual item, into the segment on the basis of a comparison between the interaction type of the virtual item and the designated interaction type the segment. A user-accessible repository operably coupled to the segment manager and configured to be updated with information on the interaction type of the virtual item and the segment the virtual item is placed in.

Embodiments of the present disclosure are also directed toward a computer program product for displaying a virtual item, generated by a user, in a physical space shared with other users, in an augmented reality environment. The computer program product comprises a computer readable storage medium having program instructions embodied therewith, the program instructions executable by a processor to cause the processor to for segments in the physical space, to designate a segment with a designated interaction type for placing the virtual, to place a virtual item generated by any given user in a segment on the basis of a comparison between the interaction type of the virtual item and the designated interaction type of the segment, and to update a user-accessible repository comprising information on the interaction type of the virtual item and the segment the virtual item is placed in.

It is to be understood that both the foregoing general description and the following detailed description are exemplary and explanatory and are intended to provide further explanation of embodiments of the invention as claimed.

BRIEF DESCRIPTION OF THE DRAWINGS

These and other features, aspects, and advantages of the embodiments of the invention will become better understood with regard to the following description, appended claims, and accompanying drawings where:

Figure 1A:
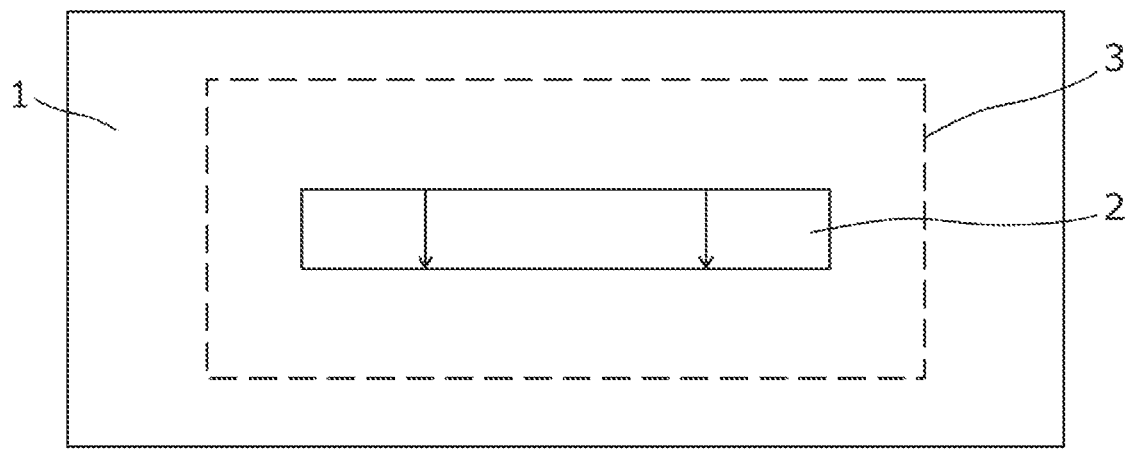
FIG. 1A and FIG. 1B schematically illustrate a general principle of operation of an embodiment of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention Like reference numerals are used to designate like parts in the accompanying drawings.

DETAILED DESCRIPTION

In the Summary above and in the Detailed Description, and the claims below, and in the accompanying drawings, reference is made to particular features (including process steps) of the disclosure. It is to be understood that the disclosure of the invention in this specification includes all possible combinations of such particular features. For example, where a particular feature is disclosed in the context of a particular aspect or embodiment, or a particular claim, that feature can also be used, to the extent possible, in combination with and/or in the context of other particular aspects and embodiments, and in the invention generally.

With the advent of augmented reality, augmented reality devices, and/or mixed reality devices, have become increasingly popular, to the extent that more companies are building and providing their own competing products.

In one embodiment, multiple users share a physical space in an augmented reality environment, where virtual items generated by any user may be displayed. Each user is provided with an augmented reality device to generate a virtual item and to display it in the physical space that it shares with the other users. For example, an augmented reality device can be a headset worn by a user that comprises a software application which, when run on a built-in data processor of the headset, facilitates a virtual item comprising a hologram to be generated and to be displayed in a part of the physical space that the users share with each other. In another embodiment, a user comprises a general entity that an augmented reality device is associated with, and/or where the virtual item is generated from.

In one embodiment, a virtual item is characterized as a possible user interaction in respect to the virtual item. The term "virtual item" and grammatical equivalents thereof are characterized as one of: a static interaction type, which is only viewable by any given user, and a direct interaction type, which may additionally be manipulated by a physical action performed by the given user. However, virtual items of other interaction types that are compatible with the general principle of operation of the present disclosure and are considered within the scope of the disclosure.

Figure 1B:
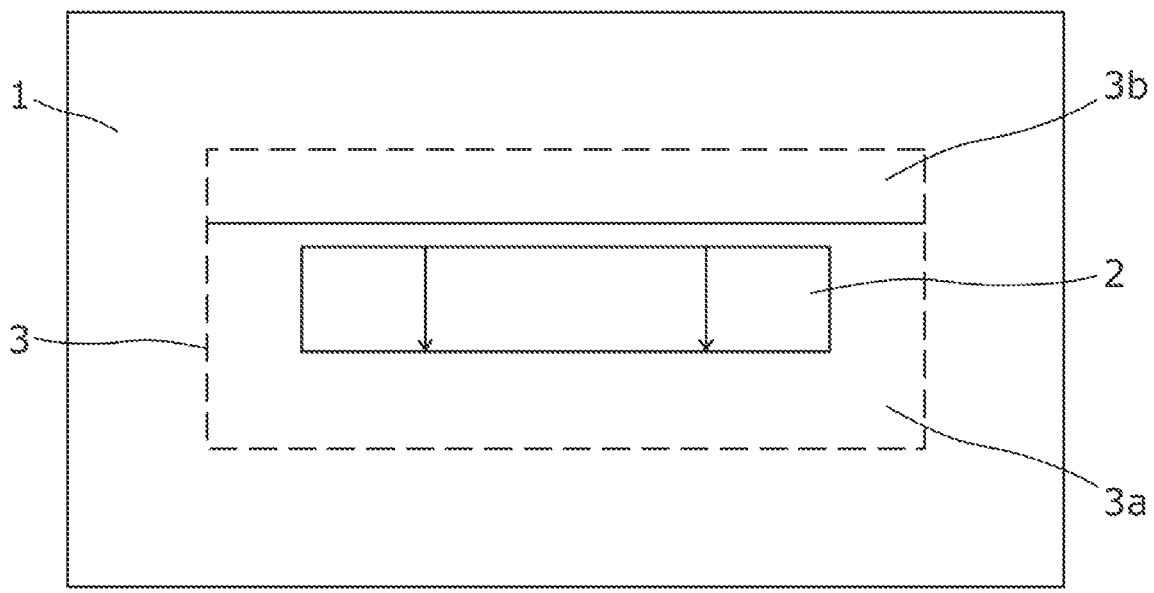

FIG. 1A and FIG. 1B schematically illustrate a general principle of operation of an embodiment of the present disclosure. In FIG. 1A, there is an area designated for displaying a virtual monitor 2 on a desk surface. The desk surface comprises a physical space 1 shared by multiple users to display a generated virtual item. A segment 3 of the physical space 1 is designated for placing a static interaction type virtual item that is generated by a user and is depicted as static interaction segment 3 in FIG. 1A. Any virtual item having a different interaction type status, for example, a direct interaction type virtual item, may not be placed anywhere in the static interaction segment 3. If virtual items of different interaction types are placed within the same segment 3, the relatively close proximity of the virtual items would increase the likelihood of an interaction conflict taking place. An example of an interaction conflict is any disruption and/or disturbance experienced by a user viewing a static interaction virtual item, due to any physical action performed by a user who is actively manipulating a direct interaction virtual item in relatively close proximity to the static interaction virtual item. In one embodiment, virtual items of different interaction type status are placed in different segments 3 and/or relatively far-removed from each other so as not to cause an interaction conflict.

As illustrated by FIG. 1A, multiple, static interaction virtual items could be placed in the static interaction segment 3, despite displaying different content. For example, one virtual item may comprise a video placed on a two-dimensional plane, while another virtual item may comprise a graphical display. A further virtual item may comprise a picture of a group of people and so forth. Due to the user-interaction with the virtual items being passive, the interaction experience of a user will not be altered due to disruption and/or interference of another user interacting with a separate virtual item held within static segment 3. Conversely, if a direct interaction virtual item (e.g., a three-dimensional model manipulation program that requires a user to physically interact with the model in three-dimensional space) is placed in the static interaction segment 3, it may disrupt and/or interfere with another user visually engaging with a static interaction virtual item in that segment. The disruption may occur because there is a likelihood of an intersection occurring, between the respective interaction patterns of the different virtual items, would be increased. For example, physical actions performed by a user engaging with the direct interaction virtual item may obstruct a view of a user viewing a static interaction virtual item. The likelihood of an obstruction is increased as the proximity of virtual items, within the segment 3/static interaction segment 3, is increased.

FIG. 1B is a block diagram of a segment 3 configured to comprise a conflict region 3a that defines an area for placing virtual items of the same interaction type, and a sub-region 3b where any other virtual item, having a different interaction type from the conflict region, may be placed. In this way, differing interaction type virtual items can be placed in the same segment with a reduced probability of interaction conflicts occurring.

In one embodiment, FIG. 1B shows a static interaction segment 3 configured to comprise a conflict region 3a for placing static interaction virtual items, and a sub-region 3b for placing virtual items of other interaction types (e.g., direct interaction virtual items).

Three-dimensional boundary conditions of a given virtual item can be used for placing the virtual item into a given segment 3. As such, virtual items can be placed relative to each other in the segment 3, such that interaction conflicts between the virtual items can be reduced. Physical conflicts can occur when physical actions, performed by different users, interact with direct interaction virtual items placed in a segment 3. In addition to considering three-dimensional boundary conditions, direct interaction virtual items can be placed, at a pre-definable distance from each other in a segment 3, so that interaction conflicts between the virtual items may be reduced.

Figure 2:
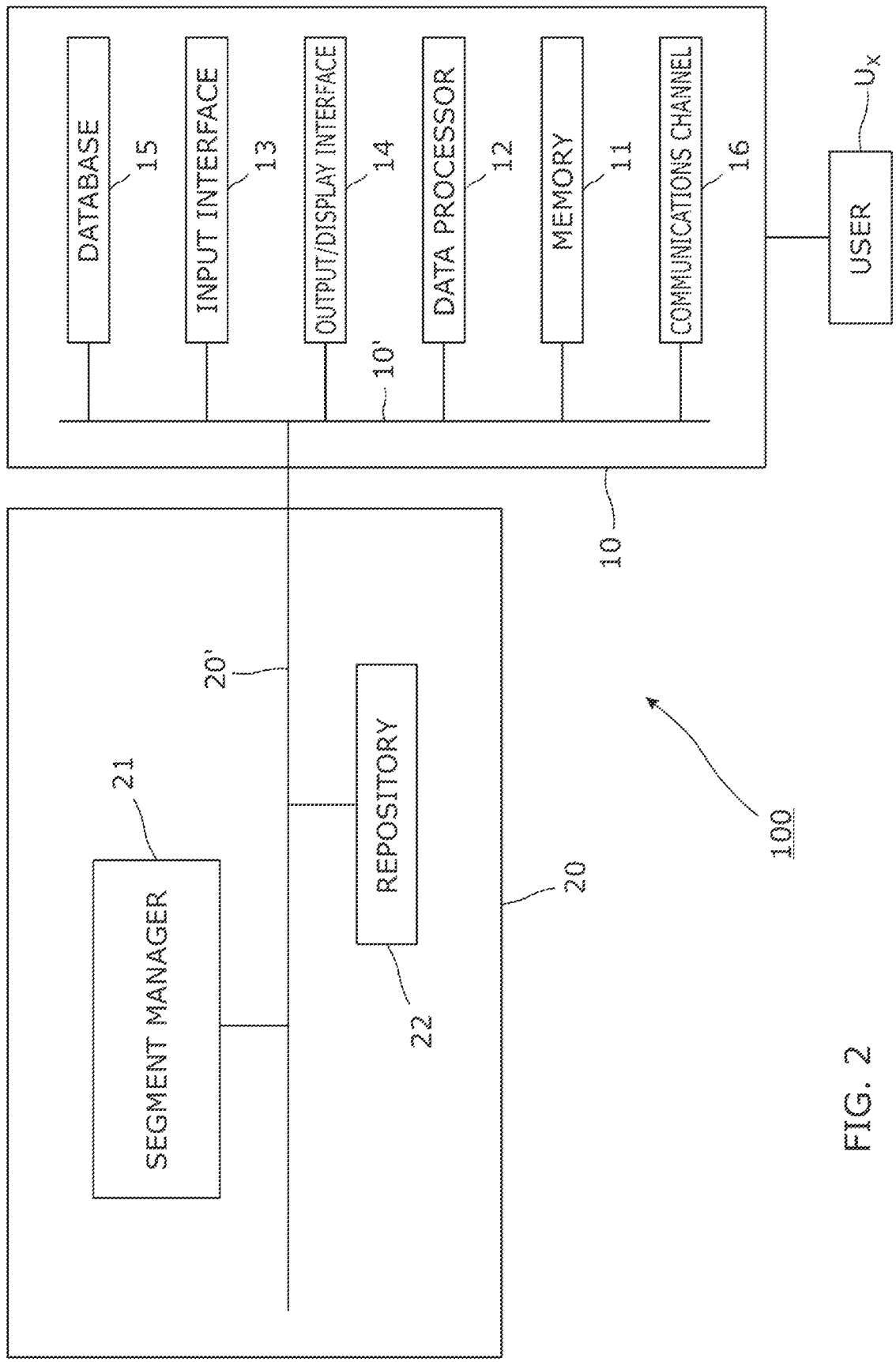
FIG. 2 schematically illustrates a general framework of operation in an embodiment of a system aspect of the present disclosure.

FIG. 2 is a block diagram illustrating a system depicting a general framework operation 100, according to an embodiment of the present disclosure. FIG. 2 depicts users displaying generated virtual items in a shared physical space 1, which is immersed in an augmented reality environment. A general framework 100 comprises a first configurational aspect 10 and second configurational aspect 20.

The first configurational aspect 10 pertains to a user Ux, where x is an integer denoting a given user. The first configurational aspect 10 comprises a memory 11 configured to store at least one executable instruction, a data processor 12 operatively coupled to the memory 11, and configured to execute an instruction received at the data processor 12 and/or stored in the memory 11. Executable instructions can be provided to the data processor 12 via an input interface 13 and/or by running a software program product, according to an embodiment of the present disclosure. An output interface 14 is also provided to facilitate a display of a generated virtual item by running a given executable instruction received at the data processor 12. A database 15 is operable to store data on a virtual item displayed by the user. A communications channel 16 is also provided to facilitate communication with other users Ux, and may comprise a communication medium (e.g., wireless media).

The second configurational aspect 20 determines how a virtual item generated by a user Ux is to be displayed. The second configurational aspect 20 is implemented by a segment manager 21 and a repository 22, operatively coupled to each other and to the user Ux.

The first configurational aspects 10 and the second configurational aspects 20 are operatively coupled by bus 10' and bus 20'. However, such operative coupling is not limited to the use of bus 10' and 20'. Coupling may be performed in any other appropriate ways within the scope of the disclosure.

In the second configurational aspect 20, the segment manager 21 is configured to form segments 3 in the physical space 1, in which virtual items, generated by given users Ux, may be placed. Formation of the segments 3 may be done by splitting the physical space 1 by the available surfaces where the virtual items can be placed, or by any other appropriate technique that is conceivable. After the segments 3 are formed, virtual items can be placed in them.

In response to placing a virtual item in an unoccupied segment 3, the segment manager 21 is configured to register information in the repository 22. The information can include the three-dimensional boundary conditions, physical location and interaction type of the virtual item. The information can be compared against information on the segment 3 in which the virtual item is placed. The segment manager 21 designates the segment 3, such that only virtual items having the same interaction type status as the virtual item first placed in that segment 3 are allowed to be placed in the segment 3. For example, a segment is designated according to the interaction type of a virtual item that is first placed in it. The interaction type designation can be ascertained from the repository 22 where it is recorded. The physical location and the three boundary conditions of a virtual item placed in the segment 3 are recorded in the repository 22. The records can be used to serve as references for subsequently placing future virtual items within the segment 3. This can prevent inadvertently placing a virtual item, in a location of segment 3, where another virtual item has already been placed.

To determine whether another virtual item, generated by any given user Ux, may also be placed in the segment 3, the repository 22 is accessed by the user Ux and consulted to perform a comparison of an interaction type of the virtual item and the segment designation.

In response to determining that an interaction type of a virtual item is the same as the segment designation, the information is communicated by the user Ux to the segment manager 21. The segment manager 21 then arranges for the virtual item to be placed in the segment 3 and for the repository 22 to be updated accordingly. The information communicated by the user Ux, to the segment manager 21, also comprises current information held in the repository 22 on how the segment 3 is occupied. For example, the information can include at least the three boundary conditions of resident virtual items and the physical location of the virtual items in relation to one another in the segment 3. Accordingly, this information can be used by the segment manager 21 to place the virtual item into a given location of the segment 3, so that reduced interaction conflicts occur between the virtual items.

Upon determining that an interaction type conflict exists regarding the placement of the virtual item in the segment 3, the user Ux can search the repository 22 as to where the virtual item can be placed. The segment manager 21 can also be updated to register the interaction conflict. The segment manager 21 can be configured to perform one of two given actions. The first action is to alter a configuration of the segment 3 such that the segment 3 comprises a conflict region 3a designated for placing virtual items of the same interaction type status as the segment designation. Also, a sub-region 3b assigned for placing the virtual item and any other virtual items that share interaction type statuses of the virtual item. In another example, it may be that the configuration of the segment 3 cannot be altered, because the segment 3 may be fully occupied. If the segment 4 is fully occupied, the segment manager 21 is configured to allocate the virtual item into a different segment 3. The repository 22 can be updated by the segment manager 21 according to the actions performed.

In one embodiment, the first configurational aspect 10 is embedded within an augmented reality device associated with a given user Ux.

While the second configurational aspect 20 is shown as being distinct from the first configurational aspect 10, in one embodiment, the second configurational aspect 20 is not restricted to such an arrangement. As such, the second configurational aspect 20, or some parts thereof, may be provided as a part of the first configurational aspect 10. For example, the repository 22 may be provided as a part of the database 15 of the first configurational aspect 10. In another embodiment, the second configurational aspect 20 is provided as a unit, or a part thereof, that is centrally accessible by any given user Ux. Use of the terms, "first" and "second", for the configurational aspect 10 and configurational aspect 20, has been done to distinguish them, and are by no means indicative of an order of importance.

Figure 3:
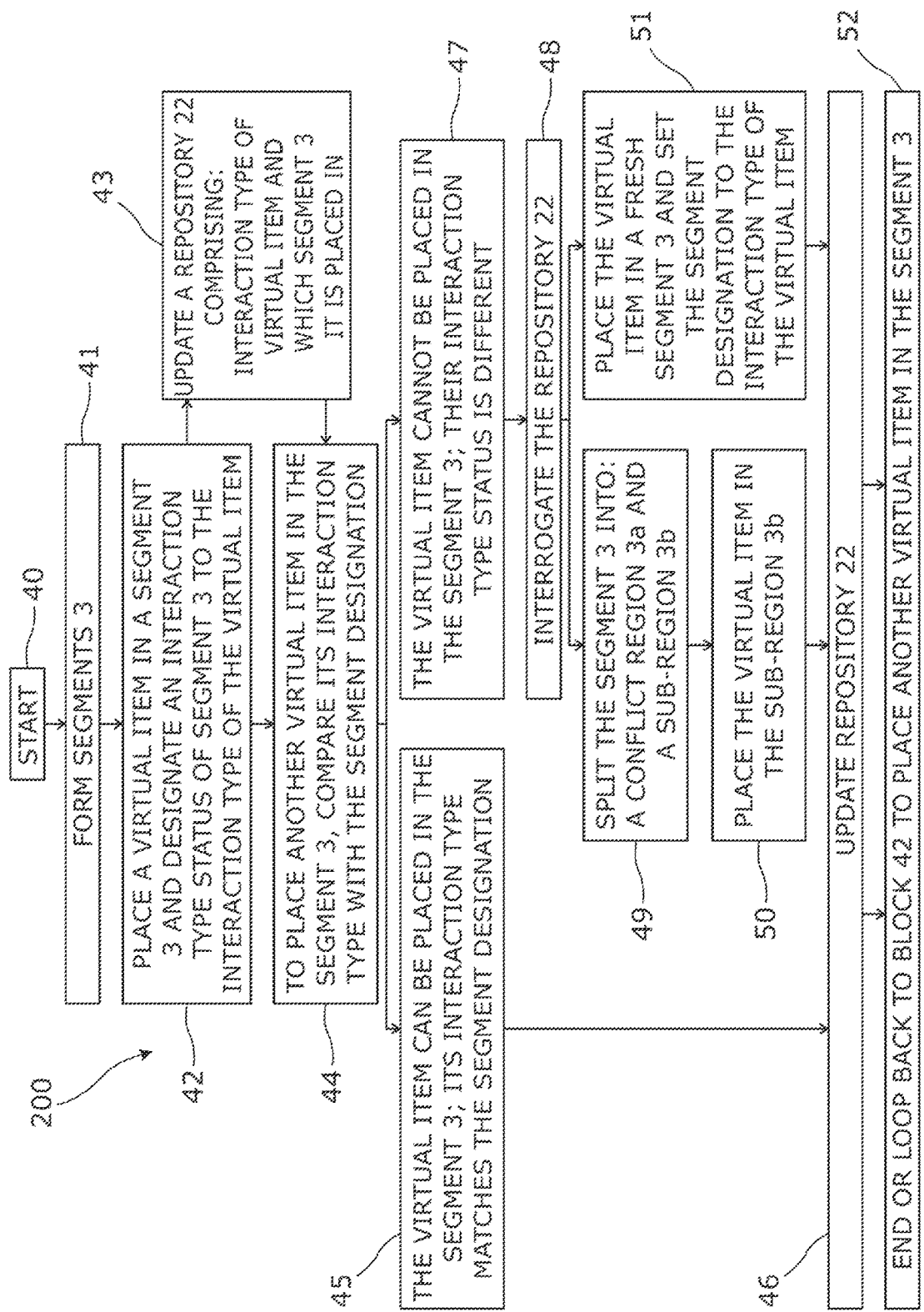
FIG. 3 shows a flowchart of an embodiment of a method aspect of the present disclosure.

FIG. 3 is a flow diagram illustrating a process 200 that is operable in an augmented reality environment comprising multiple users Ux sharing a physical space 1, which is allocated for displaying any virtual item generated by a given user Ux, according to embodiments of the present disclosure.

The method 200 starts at block 40 and progresses to block 41 where the segment manager 21, described in respect to configurational aspect 20 as shown in FIG. 2, is configured to form segments 3 in the physical space 1.

At block 42, the segment manager 21 is configured to place a virtual item, generated by a given user Ux, into an unoccupied segment 3. Segment 3 is accordingly designated by the segment manager 21 for placing other virtual items having the same interaction type status as that virtual item that originally occupies segment 3. Correspondingly, the repository 22 is updated by the segment manager 21, to register information on this event. This is illustrated at block 43. The information comprises the three-dimensional boundary conditions, the physical location and interaction type of the virtual item that is compared against information on the segment 3 with which it is placed.

Progressing to block 44, to determine whether a further virtual item generated by any given user Ux can also be placed in the segment 3, the repository 22 is accessed by that user Ux and consulted in order to perform a comparison of an interaction type of that further virtual item with the segment designation discussed in relation to block 42.

At block 45, in response to a determination by the user Ux that an interaction type of another virtual item is the same as the segment designation, the method 200 communicates the information to the segment manager 21. The segment manager 21 arranges for the other virtual item to be placed in the segment 3, and for the repository 22 to be updated as indicated at block 46. A given location in which the other virtual item is placed, relative to resident virtual items, within the segment 3 is performed as described hereinabove with reference to FIG. 2.

Upon determining that an interaction type conflict exists in respect to placing a virtual item in segment 3, the user Ux is configured to search the repository 22 for a location as to where that virtual item may be placed. This is illustrated at block 47. In response to such an interaction type conflict being registered at block 47, the segment manager 21 may perform one of two given actions 48. According to one action shown at block 49, the segment manager 21 is configured to alter a configuration of the segment 3. The configuration comprises a conflict region 3a for placing virtual items of substantially the same interaction type status as the segment designation, and a sub-region 3b that is assigned for placing the other virtual item and any other virtual items that share the same interaction type status. At block 50, the virtual item is then placed in the sub-region 3b of the altered configuration of segment 3. Alternatively, it may be that the configuration of the segment 3 cannot be altered. This is illustrated at block 51. For example, the segment 3 can be fully occupied. If this occurs, the segment manager 21 is configured to allocate the other virtual item into a different segment 3. At block 46, the repository 22 is updated by the segment manager 21 according to the action that has been performed by the segment manager 21.

Block 52 marks the end of an embodiment of the method 200. However, a loop is performed back to block 42, for placing other virtual items in a segment 3, as necessary.

At block 45, viewed in conjunction with block 49, a virtual item may be placed into a segment 3 whose structural configuration has already been altered. The virtual item can be placed within a part of the segment 3 that has been designated to correspond with the same interaction type status as that virtual item.

The present disclosure may be a system, a method and/or a computer program product at any possible technical level of integration. The computer program product may include a computer readable storage medium (or media) having computer readable program instructions thereon for causing a processor to carry out the aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable storage instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages including an object oriented program language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In any of the above aspects, the various features may be implemented in hardware or as software modules running on one or more data processors.

The present disclosure has been described above purely by way of example and modifications of detail can be made within the scope of the present disclosure.

Each feature disclosed in the description, and where appropriate, the claims and/or the drawings may be provided independently or in any appropriate combination.

What is claimed is:

1. A method for displaying a virtual item, generated by a user, in an augmented reality environment, located in a physical space, the method comprising:
　　forming a segment in the physical space;
　　designating a designated interaction type for the segment to place the virtual item;
　　comparing the designated interaction type of the segment with an interaction type of the virtual item;
　　placing, based on the comparing, the virtual item into the segment; and
　　updating a user-accessible repository, wherein the repository comprises of information based on the interaction type of the virtual item and the segment the virtual item is placed in.

2. The method of claim 1, further comprising:
　　consulting the repository; and
　　comparing the interaction type of the virtual item to be placed with the designated interaction type of the segment.

3. The method of claim 1, further comprising:
  determining whether the interaction type of the virtual item is the same as the designated interaction type of the segment;
  upon determining that the interaction type of the virtual item is the same as the designated interaction type of the segment, placing the virtual in the segment;
  upon determining that the interaction type of the virtual item is not the same as the designated interaction type of the segment, searching the repository; and
  placing, based on the searching, the virtual item into another segment.

4. The method of claim 1, further comprising:
  altering a configuration of the segment to designate a given interaction type and wherein the segment comprises:
    a conflict region for placing virtual items of the same interaction type as the designated interaction type of the segment; and
    a sub-region assigned for placing virtual items of an interaction type that are different from the designated interaction type of the segment; and
  updating the repository with information of the altered configuration of the segment.

5. The method of claim 1, wherein three-dimensional boundary conditions of the virtual item are used to place the virtual item into the segment.

6. The method of claim 2, further comprising:
  determining whether the interaction type of the virtual item is the same as the designated interaction type of the segment;
  upon determining that the interaction type of the virtual item is the same as the designated interaction type of the segment, placing the virtual in the segment;
  upon determining that the interaction type of the virtual item is not the same as the designated interaction type of the segment, searching the repository; and
  placing, based on the searching, the virtual item into another segment.

7. The method of claim 6, wherein three-dimensional boundary conditions of the virtual item are used to place the virtual item into the segment.

8. A system for displaying a virtual item, generated by a user, in a physical space, in an augmented reality environment, the system comprising:
  a segment manager operably coupled to the user and configured to:
    form a segment in the physical space;
    designate a designated interaction type for the segment for placing the virtual item;
    compare the designated interaction type of the segment with an interaction type of the virtual item;
    place, based on the comparison, the virtual item into the segment; and
  a user-accessible repository operably coupled to the segment manager and configured to be updated with information comprising the interaction type of the virtual item and the segment the virtual item is placed in.

9. A system as claimed in claim 8 wherein, the repository is further configured to be consulted to perform a comparison between the interaction type of the virtual item and the designated interaction type of the segment.

10. A system as claimed in claim 8 wherein, the segment manager is further configured to:
  determine whether the interaction type of the virtual item is the same as the designated interaction type of the segment;
  upon determining that the interaction type of the virtual item is the same as the designated interaction type of the segment, place the virtual in the segment;
  upon determining that the interaction type of the virtual item is not the same as the designated interaction type of the segment, search the repository; and
  place, based on the search of the repository, the virtual item into another segment.

11. A system as claimed in claim 8 wherein, the segment manager is further configured to:
  alter a configuration of the segment to designate a given interaction type and wherein the segment comprises:
    a conflict region for placing virtual items of the same interaction type as the designated interaction type of the segment;
    a sub-region assigned for placing virtual items of an interaction type that is different from the designated interaction type of the segment;
  and wherein the repository is further configured to be updated to record information of the altered configuration of the segment.

12. A system as claimed in claim 8 wherein, the segment manager configured to use three-dimensional boundary conditions of the virtual item to place the virtual item into the segment.

13. A system of claim 9 wherein, the segment manager is further configured to:
  determine whether the interaction type of the virtual item is the same as the designated interaction type of the segment;
  upon determining that the interaction type of the virtual item is the same as the designated interaction type of the segment, place the virtual in the segment;
  upon determining that the interaction type of the virtual item is not the same as the designated interaction type of the segment, search the repository; and
  place, based on the search of the repository, the virtual item into another segment.

14. The system of claim 13 wherein, the segment manager configured to use three-dimensional boundary conditions of the virtual item to place the virtual item into the segment.

15. A computer program product for displaying a virtual item, generated by a user, in a physical space, in an augmented reality environment, the computer program product comprising a computer readable storage medium having program instructions embodied therewith, the program instructions executable by a processor to cause the processor to:
  form a segment in the physical space;
  designate the segment with a designated interaction type for placing the virtual item;
  compare the designated interaction type of the segment with an interaction type of the virtual item;
  place, based on the comparison, the virtual item into the segment; and
  update a user-accessible repository comprising information on the interaction type of the virtual item and the segment the virtual item is placed in.

16. The computer program product as claimed in claim 15, further comprising instructions to:
  consult the repository; and
  compare the interaction type of the virtual item to be placed with the designated interaction type of the segment.

17. The computer program product as claimed in claim 15, further comprising instructions to:
  determine whether the interaction type of the virtual item is the same as the designated interaction type of the segment;
  upon determining that the interaction type of the virtual item is the same as the designated interaction type of the segment, place the virtual in the segment;
  upon determining that the interaction type of the virtual item is not the same as the designated interaction type of the segment, search the repository; and
  place, based on the search of the repository, the virtual item into another segment.

18. A computer program product as claimed in claim 15, further comprising instructions to:
  alter a configuration of the segment wherein the segment comprises:
    a conflict region for placing virtual items of the same interaction type as the designated interaction type of the segment; and
    a sub-region assigned for placing virtual items of an interaction type that are different from the designated interaction type of the segment; and
  update the repository with information of the altered configuration of the segment.

19. A computer program product as claimed in claim 15, wherein three-dimensional boundary conditions of the virtual item are used to place the virtual item into the segment.

20. The computer program product as claimed in claim 16, further comprising instructions to:
  determine whether the interaction type of the virtual item is the same as the designated interaction type of the segment;
  upon determining that the interaction type of the virtual item is the same as the designated interaction type of the segment, place the virtual in the segment;
  upon determining that the interaction type of the virtual item is not the same as the designated interaction type of the segment, search the repository; and
  place, based on the search of the repository, the virtual item into another segment.

* * * * *